United States Patent
Vilc et al.

(10) Patent No.: US 10,475,591 B2
(45) Date of Patent: Nov. 12, 2019

(54) SOLID ELECTROLYTIC CAPACITOR FOR USE IN A HUMID ATMOSPHERE

(71) Applicant: AVX Corporation, Fountain Inn, SC (US)

(72) Inventors: Ladislav Vilc, Lanskroun (CZ); Silvie Vilcova, Lanskroun (CZ); Ivan Horacek, Lanskroun (CZ)

(73) Assignee: AVX Corporation, Fountain Inn, SC (US)

( * ) Notice: Subject to any disclaimer, the term of this patent is extended or adjusted under 35 U.S.C. 154(b) by 0 days.

(21) Appl. No.: 15/810,537

(22) Filed: Nov. 13, 2017

(65) Prior Publication Data
US 2018/0137988 A1  May 17, 2018

Related U.S. Application Data

(60) Provisional application No. 62/422,087, filed on Nov. 15, 2016.

(51) Int. Cl.
*H01G 9/052* (2006.01)
*H01G 9/15* (2006.01)
(Continued)

(52) U.S. Cl.
CPC .......... *H01G 9/052* (2013.01); *C08G 61/126* (2013.01); *H01G 9/0032* (2013.01);
(Continued)

(58) Field of Classification Search
CPC .... H01G 9/052; H01G 9/0032; H01G 9/0036; H01G 9/025; H01G 9/028; H01G 9/042;
(Continued)

(56) References Cited

U.S. PATENT DOCUMENTS 3,628,103 A   12/1971 Booe
4,780,796 A   10/1988 Fukuda et al.
(Continued)

FOREIGN PATENT DOCUMENTS

| EP | 1 863 044 A1 | 12/2007 |
| EP | 1 100 097 B1 | 8/2008 |
| JP | 2007227465 A | 9/2007 |

OTHER PUBLICATIONS

Technical Data Sheet—Loctite Ablestik SSP 2020, Henkel, Dec. 2012, 2 pages.
(Continued)

*Primary Examiner* — Dion Ferguson
(74) *Attorney, Agent, or Firm* — Dority & Manning, P.A.

(57) ABSTRACT

A capacitor that is capable of exhibiting good properties under humid conditions is provided. The ability to perform under such conditions is due in part to selective control over the particular nature of the solid electrolyte and cathode coating that overlies the solid electrolyte. For example, the solid electrolyte contains pre-polymerized conductive polymer particles, which can help act as a blocking layer for any silver ions migrating through the capacitor. Likewise, the cathode coating also contains conductive metal particles (e.g., silver particles) that are dispersed within a resinous matrix. The resinous matrix includes a polymer that absorbs only a small amount of water, if any, when placed in a humid atmosphere.

23 Claims, 1 Drawing Sheet

(51) Int. Cl.
   *C08G 61/12*    (2006.01)
   *H01G 9/00*     (2006.01)
   *H01G 9/025*    (2006.01)
   *H01G 9/042*    (2006.01)
   *H01G 9/07*     (2006.01)
   *H01G 9/028*    (2006.01)
   *H01G 9/08*     (2006.01)
   *C09D 165/00*   (2006.01)

(52) U.S. Cl.
   CPC .......... *H01G 9/0036* (2013.01); *H01G 9/025* (2013.01); *H01G 9/028* (2013.01); *H01G 9/042* (2013.01); *H01G 9/07* (2013.01); *H01G 9/15* (2013.01); *C08G 2261/11* (2013.01); *C08G 2261/1424* (2013.01); *C08G 2261/18* (2013.01); *C08G 2261/228* (2013.01); *C08G 2261/3223* (2013.01); *C08G 2261/43* (2013.01); *C08G 2261/516* (2013.01); *C09D 165/00* (2013.01); *H01G 9/08* (2013.01)

(58) Field of Classification Search
   CPC ... H01G 9/07; H01G 9/15; H01G 9/08; C08G 1/126; C08G 2261/11; C08G 2261/1424; C08G 2261/18; C08G 2261/228; C08G 2261/3223; C08G 2261/43; C08G 2261/516; C09D 165/00
   See application file for complete search history.

(56) References Cited

U.S. PATENT DOCUMENTS

| | | | |
|---|---|---|---|
| 4,945,452 A | 7/1990 | Sturmer et al. | |
| 5,111,327 A | 5/1992 | Blohm et al. | |
| 5,457,862 A | 10/1995 | Sakata et al. | |
| 5,473,503 A | 12/1995 | Sakata et al. | |
| 5,729,428 A | 3/1998 | Sakata et al. | |
| 5,812,367 A | 9/1998 | Kudoh et al. | |
| 6,197,252 B1 | 3/2001 | Bishop et al. | |
| 6,324,051 B1 | 11/2001 | Igaki et al. | |
| 6,635,729 B1 | 10/2003 | Groenendaal et al. | |
| 6,671,167 B2 | 12/2003 | Araki et al. | |
| 6,674,635 B1 | 1/2004 | Fife et al. | |
| 6,798,665 B2 | 9/2004 | Kimura | |
| 6,845,004 B2 | 1/2005 | Melody et al. | |
| 6,965,508 B2 | 11/2005 | Takatani et al. | |
| 6,987,663 B2 | 1/2006 | Merker et al. | |
| 7,152,429 B2 | 12/2006 | Paradowski | |
| 7,262,511 B2 | 8/2007 | Osako et al. | |
| 7,515,396 B2 | 4/2009 | Biler | |
| 8,035,953 B2 | 10/2011 | Nemoto et al. | |
| 8,125,768 B2 | 2/2012 | Horacek et al. | |
| 8,203,827 B2 | 6/2012 | Karnik | |
| 8,379,372 B2 | 2/2013 | Zednicek et al. | |
| 8,896,985 B2 | 11/2014 | Chacko et al. | |
| 8,896,986 B2 | 11/2014 | Chacko et al. | |
| 8,902,565 B2 | 12/2014 | McConnell et al. | |
| 9,190,217 B2 | 11/2015 | Snyder et al. | |
| 9,236,192 B2 | 1/2016 | Biler et al. | |
| 9,236,193 B2 | 1/2016 | Tatsuno et al. | |
| 9,275,798 B2 | 3/2016 | Momo et al. | |
| 9,293,263 B2 | 3/2016 | Liu et al. | |
| 9,748,043 B2 | 8/2017 | Chacko et al. | |
| 9,779,874 B2 | 10/2017 | McConnell et al. | |
| 9,793,057 B2 | 10/2017 | McConnell et al. | |
| 9,881,774 B2 | 1/2018 | Frantz et al. | |
| 2007/0171596 A1* | 7/2007 | Chacko | H01G 9/012 361/523 |
| 2008/0123251 A1 | 5/2008 | Randall et al. | |
| 2008/0266756 A1* | 10/2008 | Fujita | H01G 9/0029 361/523 |
| 2009/0021894 A1* | 1/2009 | Ning | C09D 5/24 361/527 |
| 2009/0195968 A1 | 8/2009 | Naito | |
| 2010/0097743 A1* | 4/2010 | Yoshida | C08K 5/34 361/504 |
| 2011/0051323 A1* | 3/2011 | Ning | H01G 9/028 361/527 |
| 2012/0300370 A1* | 11/2012 | Chacko | H01G 9/028 361/528 |
| 2013/0114184 A1* | 5/2013 | Kochi | H01G 9/012 361/524 |
| 2013/0163150 A1* | 6/2013 | Nobuta | B32B 27/08 361/525 |
| 2015/0049419 A1* | 2/2015 | Biler | H01G 9/025 361/525 |
| 2016/0104580 A1 | 4/2016 | Maeshima et al. | |
| 2016/0351336 A1* | 12/2016 | Uher | H01G 9/025 |
| 2018/0108489 A1* | 4/2018 | Nakata | C08G 61/126 |
| 2018/0137986 A1* | 5/2018 | Vilc | C08G 61/126 |
| 2018/0137987 A1* | 5/2018 | Vilc | H01G 4/38 |

OTHER PUBLICATIONS

Technical Data Sheet for Hysol® MG33F-0588, Electronic Grade Epoxy Molding Compound, Loctite, Henkel, May 2000, 2 pages.
Technical Data Sheet for GR2310™, Hysol®, Henkel, Jun. 2009, 2 pages.
Technical Data Sheet for Loctite Hysol GR 2811, Henkel, Jul. 2012, 2 pages.
Material Safety Data Sheet according to (EC) No. 1907/2006 for Loctite Hysol CG6077 GR2811, Henkel, Jun. 28, 2013, 8 pages.
Material Safety Data Sheer for Thermoset K 611-14, AVX, Jan. 10, 2015, 9 pages.
Product Information for Silver Coating for Conductive Polymer—Thermoset K 611-14, AVX, Jan. 21, 2013, 2 pages.
Material Safet Data Sheet for Silver N-2064, AVX, Jul. 9, 2015, 4 pages.
Product Information for Conductive Paste N-2064, Sep. 17, 2015, 5 pages.
Paper—Introduction of SHOEI's Approach for Developing Silver Paste for Conductive Polymer Tantalum Capacitors, SHOEI Chemical, Inc., Jun. 2014, 16 pages.
Paper—Silver Sintering for Power Electronics, Henkel, Oct. 23, 2014, 21 pages.
International Search Report and Written Opinion for PCT/US2017/061433 dated Feb. 28, 2018, 14 pages.

* cited by examiner

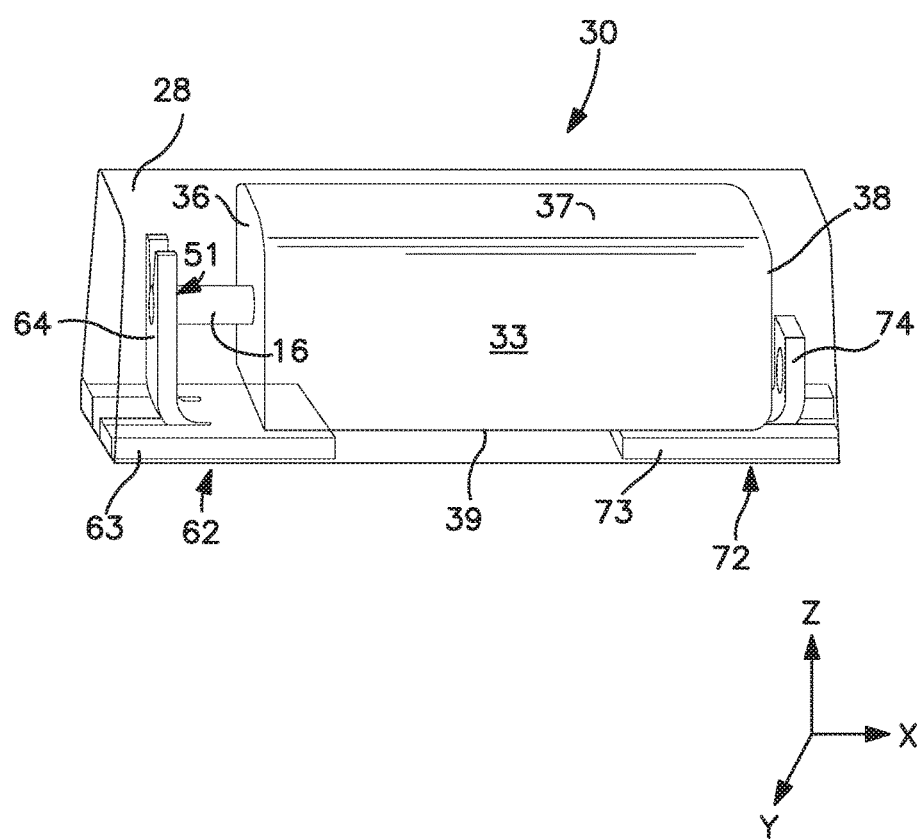

SOLID ELECTROLYTIC CAPACITOR FOR USE IN A HUMID ATMOSPHERE

CROSS REFERENCE TO RELATED APPLICATION

The present application claims filing benefit of U.S. Provisional Patent Application Ser. No. 62/422,087 having a filing date of Nov. 15, 2016, and which is incorporated herein by reference in its entirety.

BACKGROUND OF THE INVENTION

Tantalum polymer capacitors are formed from a sintered tantalum anode on which is disposed a solid electrolyte, silver layer, and carbon layer. However, one problem that is often associated with conventional solid electrolytic capacitors is that the silver layer tends to form ions when exposed to a high humidity environment (e.g., 85% relative humidity), especially at high temperatures (e.g., 85° C.). These ions can migrate through the electrolyte and re-deposit as silver on the anode surface, which may in turn result in an increase of leakage current. As such, a need exists for an improved solid electrolytic capacitor that can be used in humid conditions.

SUMMARY OF THE INVENTION

In accordance with one embodiment of the present invention, a solid electrolytic capacitor is disclosed that comprises a sintered porous anode body, a dielectric that overlies the anode body, a solid electrolyte that overlies the dielectric, wherein the solid electrolyte includes a plurality of conductive polymer particles, and a cathode coating that contains a metal particle layer that overlies the solid electrolyte. The metal particle layer includes a plurality of conductive metal particles dispersed within a resinous polymer matrix. The particles constitute from about 50 wt. % to about 99 wt. % of the layer and the resinous polymer matrix constitutes from about 1 wt. % to about 50 wt. % of the layer. The resinous polymer matrix includes a vinyl acetal polymer.

In accordance with another embodiment of the present invention, a solid electrolytic capacitor is disclosed that comprises a sintered porous anode body that includes tantalum, a dielectric that overlies the anode body, wherein the dielectric includes an oxide of tantalum, a solid electrolyte that overlies the dielectric, wherein the solid electrolyte includes a plurality of conductive polymer particles that include a thiophene polymer, and a cathode coating that contains a metal particle layer that overlies the solid electrolyte. The metal particle layer includes a plurality of silver particles dispersed within a resinous polymer matrix. The particles constitute from about 50 wt. % to about 99 wt. % of the layer and the resinous polymer matrix constitutes from about 1 wt. % to about 50 wt. % of the layer. The cathode coating exhibits a moisture content of about 10 wt. % or less when exposed to an atmosphere having an 85% relative humidity in accordance with ASTM D6869-03 (2011).

In accordance with yet another embodiment of the present invention, a method for forming a capacitor is disclosed that comprises anodically oxidizing a sintered porous anode body to form a dielectric that includes an oxide of a valve metal compound, applying a dispersion that contains conductive polymer particles to form a solid electrolyte layer, applying a metal paste over the solid electrolyte layer, wherein the paste contains a plurality of conductive metal particles, a vinyl acetal polymer, and an organic solvent, drying the metal paste.

Other features and aspects of the present invention are set forth in greater detail below.

BRIEF DESCRIPTION OF THE DRAWING

A full and enabling disclosure of the present invention, including the best mode thereof, directed to one of ordinary skill in the art, is set forth more particularly in the remainder of the specification, which makes reference to the appended FIGURE in which:

FIG. 1 is a schematic illustration of one embodiment of a capacitor that may be formed in accordance with the present invention.

Repeat use of references characters in the present specification and drawing is intended to represent same or analogous features or elements of the invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Generally speaking, the present invention is directed to a capacitor that is capable of exhibiting good properties under humid conditions. The ability to perform under such conditions is due in part to selective control over the particular nature of the solid electrolyte and cathode coating that overlies the solid electrolyte. For example, the solid electrolyte contains pre-polymerized conductive polymer particles, which can help act as a blocking layer for any silver ions migrating through the capacitor. Likewise, the cathode coating also contains conductive metal particles (e.g., silver particles) that are dispersed within a resinous matrix. The resinous matrix includes a polymer that absorbs only a small amount of water, if any, when placed in a humid atmosphere. For example, when exposed to an atmosphere having an 85% relative humidity, the cathode coating may exhibit a moisture content of about 10 wt. % or less, in some embodiments about 5 wt. % or less, and in some embodiments, contain about 3 wt. % or less, and in some embodiments, about 1 wt. % or less. Moisture content may be determined in accordance with ASTM D6869-03 (2011), such as with a Karl Fischer Automatic moisture tester (e.g., Karl Fischer Metrohm Model #831 Coulometer and Karl Fischer Model #832 Thermoprep). Because the polymer tends to absorb a relatively low amount of water, the tendency of the silver to form ions and migrate to the anode surface can be reduced.

Due to its unique structure, the resulting capacitor is not highly sensitive to moisture and can thus exhibit excellent electrical properties even when exposed to high humidity levels, such as when placed into contact with an atmosphere having a relative humidity of about 40% or more, in some embodiments about 45% or more, in some embodiments about 50% or more, and in some embodiments, about 70% or more (e.g., about 85% to 100%). Relative humidity may, for instance, be determined in accordance with ASTM E337-02, Method A (2007). The humid atmosphere may be part of the internal atmosphere of the capacitor assembly itself, or it may be an external atmosphere to which the capacitor assembly is exposed during storage and/or use.

The capacitor may, for instance, exhibit a relatively low equivalence series resistance ("ESR") when exposed to the high humidity atmosphere (e.g., 85% relative humidity), such as about 350 mohms, in some embodiments less than about 150 mohms, in some embodiments from about 0.01 to about 300 mohms, and in some embodiments, from about 0.1 to about 200 mohms, measured at an operating frequency of 100 kHz. The capacitor assembly may exhibit a DCL of only about 50 microamps ("μA") or less, in some embodiments about 40 μA or less, in some embodiments about 20 μA or less, and in some embodiments, from about 0.1 to about 10 μA. The capacitor assembly may also exhibit a high percentage of its wet capacitance, which enables it to have only a small capacitance loss and/or fluctuation in the presence of atmosphere humidity. This performance characteristic is quantified by the "wet-to-dry capacitance percentage", which is determined by the equation:

Wet-to-Dry Capacitance=(Dry Capacitance/Wet Capacitance)×100

The capacitor assembly may exhibit a wet-to-dry capacitance percentage of about 50% or more, in some embodiments about 60% or more, in some embodiments about 70% or more, and in some embodiments, from about 80% to 100%. The dry capacitance may be about 30 nanoFarads per square centimeter ("nF/cm$^2$") or more, in some embodiments about 100 nF/cm$^2$ or more, in some embodiments from about 200 to about 3,000 nF/cm$^2$, and in some embodiments, from about 400 to about 2,000 nF/cm$^2$, measured at a frequency of 120 Hz.

Notably, the ESR, DCL, and capacitance values may even be maintained for a substantial amount of time and at high temperatures. For example, the values may be maintained for about 100 hours or more, in some embodiments from about 300 hours to about 3,000 hours, and in some embodiments, from about 400 hours to about 2,500 hours (e.g., 500 hours, 600 hours, 700 hours, 800 hours, 900 hours, 1,000 hours, 1,100 hours, 1,200 hours, or 2,000 hours) at temperatures ranging from 50° C. to 250° C., and, in some embodiments from 70° C. to 200° C., and in some embodiments, from 80° C. to about 150° C. (e.g., 85° C.), and at a high humidity level. In one embodiment, for instance, the values may be maintained for 1,000 hours at a temperature of 85° C.

Various embodiments of the capacitor will now be described in more detail.

I. Anode

A. Anode Body

The capacitor includes an anode that contains a dielectric formed on a sintered porous body. The porous anode body may be formed from a powder that contains a valve metal (i.e., metal that is capable of oxidation) or valve metal-based compound, such as tantalum, niobium, aluminum, hafnium, titanium, alloys thereof, oxides thereof, nitrides thereof, and so forth. The powder is typically formed from a reduction process in which a tantalum salt (e.g., potassium fluotantalate ($K_2TaF_7$), sodium fluotantalate ($Na_2TaF_7$), tantalum pentachloride ($TaCl_5$), etc.) is reacted with a reducing agent. The reducing agent may be provided in the form of a liquid, gas (e.g., hydrogen), or solid, such as a metal (e.g., sodium), metal alloy, or metal salt. In one embodiment, for instance, a tantalum salt (e.g., $TaCl_5$) may be heated at a temperature of from about 900° C. to about 2,000° C., in some embodiments from about 1,000° C. to about 1,800° C., and in some embodiments, from about 1,100° C. to about 1,600° C., to form a vapor that can be reduced in the presence of a gaseous reducing agent (e.g., hydrogen). Additional details of such a reduction reaction may be described in WO 2014/199480 to Maeshima, et al. After the reduction, the product may be cooled, crushed, and washed to form a powder.

The specific charge of the powder typically varies from about 2,000 to about 800,000 microFarads*Volts per gram ("μF*V/g") depending on the desired application. For instance, in certain embodiments, a high charge powder may be employed that has a specific charge of from about 100,000 to about 800,000 μF*V/g, in some embodiments from about 120,000 to about 700,000 μF*V/g, and in some embodiments, from about 150,000 to about 600,000 μF*V/g. In other embodiments, a low charge powder may be employed that has a specific charge of from about 2,000 to about 100,000 μF*V/g, in some embodiments from about 5,000 to about 80,000 μF*V/g, and in some embodiments, from about 10,000 to about 70,000 μF*V/g. As is known in the art, the specific charge may be determined by multiplying capacitance by the anodizing voltage employed, and then dividing this product by the weight of the anodized electrode body.

The powder may be a free-flowing, finely divided powder that contains primary particles. The primary particles of the powder generally have a median size (D50) of from about 5 to about 500 nanometers, in some embodiments from about 10 to about 400 nanometers, and in some embodiments, from about 20 to about 250 nanometers, such as determined using a laser particle size distribution analyzer made by BECKMAN COULTER Corporation (e.g., LS-230), optionally after subjecting the particles to an ultrasonic wave vibration of 70 seconds. The primary particles typically have a three-dimensional granular shape (e.g., nodular or angular). Such particles typically have a relatively low "aspect ratio", which is the average diameter or width of the particles divided by the average thickness ("D/T"). For example, the aspect ratio of the particles may be about 4 or less, in some embodiments about 3 or less, and in some embodiments, from about 1 to about 2. In addition to primary particles, the powder may also contain other types of particles, such as secondary particles formed by aggregating (or agglomerating) the primary particles. Such secondary particles may have a median size (D50) of from about 1 to about 500 micrometers, and in some embodiments, from about 10 to about 250 micrometers.

Agglomeration of the particles may occur by heating the particles and/or through the use of a binder. For example, agglomeration may occur at a temperature of from about 0° C. to about 40° C., in some embodiments from about 5° C. to about 35° C., and in some embodiments, from about 15° C. to about 30° C. Suitable binders may likewise include, for instance, poly(vinyl butyral); poly(vinyl acetate); poly(vinyl alcohol); poly(vinyl pyrollidone); cellulosic polymers, such as carboxymethylcellulose, methyl cellulose, ethyl cellulose, hydroxyethyl cellulose, and methylhydroxyethyl cellulose; atactic polypropylene, polyethylene; polyethylene glycol (e.g., Carbowax from Dow Chemical Co.); polystyrene, poly(butadiene/styrene); polyamides, polyimides, and polyacrylamides, high molecular weight polyethers; copolymers of ethylene oxide and propylene oxide; fluoropolymers, such as polytetrafluoroethylene, polyvinylidene fluoride, and fluoro-olefin copolymers; acrylic polymers, such as sodium polyacrylate, poly(lower alkyl acrylates), poly (lower alkyl methacrylates) and copolymers of lower alkyl acrylates and methacrylates; and fatty acids and waxes, such as stearic and other soapy fatty acids, vegetable wax, microwaxes (purified paraffins), etc.

The resulting powder may be compacted to form a pellet using any conventional powder press device. For example, a press mold may be employed that is a single station compaction press containing a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing. The powder may be compacted around an anode lead, which may be in the form of a wire, sheet, etc. The lead may extend in a longitudinal direction from the anode body and may be formed from any electrically conductive material, such as tantalum, niobium, aluminum, hafnium, titanium, etc., as well as electrically conductive oxides and/or nitrides of thereof. Connection of the lead may also be accomplished using other known techniques, such as by welding the lead to the body or embedding it within the anode body during formation (e.g., prior to compaction and/or sintering).

Any binder may be removed after pressing by heating the pellet under vacuum at a certain temperature (e.g., from about 150° C. to about 500° C.) for several minutes. Alternatively, the binder may also be removed by contacting the pellet with an aqueous solution, such as described in U.S. Pat. No. 6,197,252 to Bishop, et al. Thereafter, the pellet is sintered to form a porous, integral mass. The pellet is typically sintered at a temperature of from about 700° C. to about 1600° C., in some embodiments from about 800° C. to about 1500° C., and in some embodiments, from about 900° C. to about 1200° C., for a time of from about 5 minutes to about 100 minutes, and in some embodiments, from about 8 minutes to about 15 minutes. This may occur in one or more steps. If desired, sintering may occur in an atmosphere that limits the transfer of oxygen atoms to the anode. For example, sintering may occur in a reducing atmosphere, such as in a vacuum, inert gas, hydrogen, etc. The reducing atmosphere may be at a pressure of from about 10 Torr to about 2000 Torr, in some embodiments from about 100 Torr to about 1000 Torr, and in some embodiments, from about 100 Torr to about 930 Torr. Mixtures of hydrogen and other gases (e.g., argon or nitrogen) may also be employed.

B. Dielectric

The anode is also coated with a dielectric. The dielectric may be formed by anodically oxidizing ("anodizing") the sintered anode so that a dielectric layer is formed over and/or within the anode. For example, a tantalum (Ta) anode may be anodized to tantalum pentoxide ($Ta_2O_5$). Typically, anodization is performed by initially applying a solution to the anode, such as by dipping anode into the electrolyte. A solvent is generally employed, such as water (e.g., deionized water). To enhance ionic conductivity, a compound may be employed that is capable of dissociating in the solvent to form ions. Examples of such compounds include, for instance, acids, such as described below with respect to the electrolyte. For example, an acid (e.g., phosphoric acid) may constitute from about 0.01 wt. % to about 5 wt. %, in some embodiments from about 0.05 wt. % to about 0.8 wt. %, and in some embodiments, from about 0.1 wt. % to about 0.5 wt. % of the anodizing solution. If desired, blends of acids may also be employed.

A current is passed through the anodizing solution to form the dielectric layer. The value of the formation voltage manages the thickness of the dielectric layer. For example, the power supply may be initially set up at a galvanostatic mode until the required voltage is reached. Thereafter, the power supply may be switched to a potentiostatic mode to ensure that the desired dielectric thickness is formed over the entire surface of the anode. Of course, other known methods may also be employed, such as pulse or step potentiostatic methods. The voltage at which anodic oxidation occurs typically ranges from about 4 to about 250 V, and in some embodiments, from about 5 to about 200 V, and in some embodiments, from about 10 to about 150 V. During oxidation, the anodizing solution can be kept at an elevated temperature, such as about 30° C. or more, in some embodiments from about 40° C. to about 200° C., and in some embodiments, from about 50° C. to about 100° C. Anodic oxidation can also be done at ambient temperature or lower. The resulting dielectric layer may be formed on a surface of the anode and within its pores.

Although not required, in certain embodiments, the dielectric layer may possess a differential thickness throughout the anode in that it possesses a first portion that overlies an external surface of the anode and a second portion that overlies an interior surface of the anode. In such embodiments, the first portion is selectively formed so that its thickness is greater than that of the second portion. It should be understood, however, that the thickness of the dielectric layer need not be uniform within a particular region. Certain portions of the dielectric layer adjacent to the external surface may, for example, actually be thinner than certain portions of the layer at the interior surface, and vice versa. Nevertheless, the dielectric layer may be formed such that at least a portion of the layer at the external surface has a greater thickness than at least a portion at the interior surface. Although the exact difference in these thicknesses may vary depending on the particular application, the ratio of the thickness of the first portion to the thickness of the second portion is typically from about 1.2 to about 40, in some embodiments from about 1.5 to about 25, and in some embodiments, from about 2 to about 20.

To form a dielectric layer having a differential thickness, a multi-stage process is generally employed. In each stage of the process, the sintered anode is anodically oxidized ("anodized") to form a dielectric layer (e.g., tantalum pentoxide). During the first stage of anodization, a relatively small forming voltage is typically employed to ensure that the desired dielectric thickness is achieved for the inner region, such as forming voltages ranging from about 1 to about 90 volts, in some embodiments from about 2 to about 50 volts, and in some embodiments, from about 5 to about 20 volts. Thereafter, the sintered body may then be anodically oxidized in a second stage of the process to increase the thickness of the dielectric to the desired level. This is generally accomplished by anodizing in an electrolyte at a higher voltage than employed during the first stage, such as at forming voltages ranging from about 50 to about 350 volts, in some embodiments from about 60 to about 300 volts, and in some embodiments, from about 70 to about 200 volts. During the first and/or second stages, the electrolyte may be kept at a temperature within the range of from about 15° C. to about 95° C., in some embodiments from about 20° C. to about 90° C., and in some embodiments, from about 25° C. to about 85° C.

The electrolytes employed during the first and second stages of the anodization process may be the same or different. Typically, however, it is desired to employ different solutions to help better facilitate the attainment of a higher thickness at the outer portions of the dielectric layer. For example, it may be desired that the electrolyte employed in the second stage has a lower ionic conductivity than the electrolyte employed in the first stage to prevent a significant amount of oxide film from forming on the internal surface of anode. In this regard, the electrolyte employed during the first stage may contain an acidic compound, such as hydrochloric acid, nitric acid, sulfuric acid, phosphoric acid, polyphosphoric acid, boric acid, boronic acid, etc. Such an electrolyte may have an electrical conductivity of from about 0.1 to about 100 mS/cm, in some embodiments from about 0.2 to about 20 mS/cm, and in some embodiments, from about 1 to about 10 mS/cm, determined at a temperature of 25° C. The electrolyte employed during the second stage typically contains a salt of a weak acid so that the hydronium ion concentration increases in the pores as a result of charge passage therein. Ion transport or diffusion is such that the weak acid anion moves into the pores as necessary to balance the electrical charges. As a result, the concentration of the principal conducting species (hydronium ion) is reduced in the establishment of equilibrium between the hydronium ion, acid anion, and undissociated acid, thus forms a poorer-conducting species. The reduction in the concentration of the conducting species results in a relatively high voltage drop in the electrolyte, which hinders further anodization in the interior while a thicker oxide layer, is being built up on the outside to a higher formation voltage in the region of continued high conductivity. Suitable weak acid salts may include, for instance, ammonium or alkali metal salts (e.g., sodium, potassium, etc.) of boric acid, boronic acid, acetic acid, oxalic acid, lactic acid, adipic acid, etc. Particularly suitable salts include sodium tetraborate and ammonium pentaborate. Such electrolytes typically have an electrical conductivity of from about 0.1 to about 20 mS/cm, in some embodiments from about 0.5 to about 10 mS/cm, and in some embodiments, from about 1 to about 5 mS/cm, determined at a temperature of 25° C.

If desired, each stage of anodization may be repeated for one or more cycles to achieve the desired dielectric thickness. Furthermore, the anode may also be rinsed or washed with another solvent (e.g., water) after the first and/or second stages to remove the electrolyte.

C. Solid Electrolyte

As indicated above, a solid electrolyte overlies the dielectric and generally functions as the cathode for the capacitor assembly. The solid electrolyte contains one or more layers containing extrinsically and/or intrinsically conductive polymer particles. One benefit of employing such particles is that they can minimize the presence of ionic species (e.g., $Fe^{2+}$ or $Fe^{3+}$) produced during conventional in situ polymerization processes, which can cause dielectric breakdown under high electric field due to ionic migration. Thus, by applying the conductive polymer as pre-polymerized particles rather through in situ polymerization, the resulting capacitor may exhibit a relatively high "breakdown voltage." If desired, the solid electrolyte may be formed from one or multiple layers. When multiple layers are employed, it is possible that one or more of the layers includes a conductive polymer formed by in situ polymerization. However, when it is desired to achieve very high breakdown voltages, the present inventors have discovered that the solid electrolyte is formed primarily from the conductive particles described above, and that it is generally free of conductive polymers formed via in situ polymerization. Regardless of the number of layers employed, the resulting solid electrolyte typically has a total a thickness of from about 1 micrometer (μm) to about 200 μm, in some embodiments from about 2 μm to about 50 μm, and in some embodiments, from about 5 μm to about 30 μm.

Any of a variety of conductive polymers may generally be employed in the solid electrolyte, such as thiophene polymers, aniline polymers, pyrrole polymers, etc. Thiophene polymers are particularly suitable. In certain embodiments, for instance, an "extrinsically" conductive thiophene polymer may be employed in the solid electrolyte that has repeating units of the following formula (III):

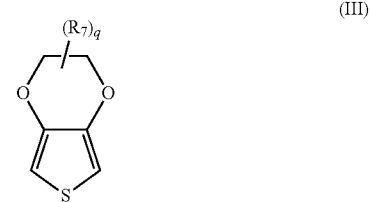

wherein, $R_7$ is a linear or branched, $C_1$ to $C_{18}$ alkyl radical (e.g., methyl, ethyl, n- or iso-propyl, n-, iso-, sec- or tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl, n-octadecyl, etc.); $C_5$ to $C_{12}$ cycloalkyl radical (e.g., cyclopentyl, cyclohexyl, cycloheptyl, cyclooctyl, cyclononyl, cyclodecyl, etc.); $C_6$ to $C_{14}$ aryl radical (e.g., phenyl, naphthyl, etc.); $C_7$ to $C_{18}$ aralkyl radical (e.g., benzyl, o-, m-, p-tolyl, 2,3-, 2,4-, 2,5-, 2-6, 3-4-, 3,5-xylyl, mesityl, etc.); and q is an integer from 0 to 8, in some embodiments, from 0 to 2, and in one embodiment, 0. In one particular embodiment, "q" is 0 and the polymer is poly(3,4-ethylenedioxythiophene). One commercially suitable example of a monomer suitable for forming such a polymer is 3,4-ethylenedioxthiophene, which is available from Heraeus under the designation Clevios™ M.

The polymers of formula (III) are generally considered to be "extrinsically" conductive to the extent that they typically require the presence of a separate counterion that is not covalently bound to the polymer. The counterion may be a monomeric or polymeric anion that counteracts the charge of the conductive polymer. Polymeric anions can, for example, be anions of polymeric carboxylic acids (e.g., polyacrylic acids, polymethacrylic acid, polymaleic acids, etc.); polymeric sulfonic acids (e.g., polystyrene sulfonic acids ("PSS"), polyvinyl sulfonic acids, etc.); and so forth. The acids may also be copolymers, such as copolymers of vinyl carboxylic and vinyl sulfonic acids with other polymerizable monomers, such as acrylic acid esters and styrene. Likewise, suitable monomeric anions include, for example, anions of $C_1$ to $C_{20}$ alkane sulfonic acids (e.g., dodecane sulfonic acid); aliphatic perfluorosulfonic acids (e.g., trifluoromethane sulfonic acid, perfluorobutane sulfonic acid or perfluorooctane sulfonic acid); aliphatic $C_1$ to $C_{20}$ carboxylic acids (e.g., 2-ethyl-hexylcarboxylic acid); aliphatic perfluorocarboxylic acids (e.g., trifluoroacetic acid or perfluorooctanoic acid); aromatic sulfonic acids optionally substituted by $C_1$ to $C_{20}$ alkyl groups (e.g., benzene sulfonic acid, o-toluene sulfonic acid, p-toluene sulfonic acid or dodecylbenzene sulfonic acid); cycloalkane sulfonic acids (e.g., camphor sulfonic acid or tetrafluoroborates, hexafluorophosphates, perchlorates, hexafluoroantimonates, hexafluoroarsenates or hexachloroantimonates); and so forth. Particularly suitable counteranions are polymeric anions, such as a polymeric carboxylic or sulfonic acid (e.g., polystyrene sulfonic acid ("PSS")). The molecular weight of such polymeric anions typically ranges from about 1,000 to about 2,000,000, and in some embodiments, from about 2,000 to about 500,000.

Intrinsically conductive polymers may also be employed that have a positive charge located on the main chain that is at least partially compensated by anions covalently bound to the polymer. For example, one example of a suitable intrinsically conductive thiophene polymer may have repeating units of the following formula (IV):

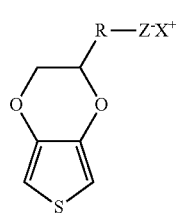

(IV)

wherein,

R is $(CH_2)_a$—O—$(CH_2)_b$;

a is from 0 to 10, in some embodiments from 0 to 6, and in some embodiments, from 1 to 4 (e.g., 1);

b is from 1 to 18, in some embodiments from 1 to 10, and in some embodiments, from 2 to 6 (e.g., 2, 3, 4, or 5);

Z is an anion, such as $SO_3^-$, $C(O)O^-$, $BF_4^-$, $CF_3SO_3^-$, $SbF_6^-$, $N(SO_2CF_3)_2^-$, $C_4H_3O_4^-$, $ClO_4^-$, etc.;

X is a cation, such as hydrogen, an alkali metal (e.g., lithium, sodium, rubidium, cesium or potassium), ammonium, etc.

In one particular embodiment, Z in formula (IV) is a sulfonate ion such that the intrinsically conductive polymer contains repeating units of the following formula (V):

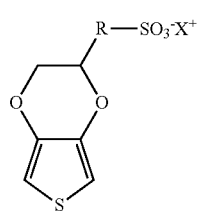

(V)

wherein, R and X are defined above. In formula (IV) or (V), a is preferably 1 and b is preferably 3 or 4. Likewise, X is preferably sodium or potassium.

If desired, the polymer may be a copolymer that contains other types of repeating units. In such embodiments, the repeating units of formula (IV) typically constitute about 50 mol. % or more, in some embodiments from about 75 mol. % to about 99 mol. %, and in some embodiments, from about 85 mol. % to about 95 mol. % of the total amount of repeating units in the copolymer. Of course, the polymer may also be a homopolymer to the extent that it contains 100 mol. % of the repeating units of formula (IV). Specific examples of such homopolymers include poly(4-(2,3-dihydrothieno-[3,4-b][1,4]dioxin-2-ylmethoxy)-1-butane-sulphonic acid, salt) and poly(4-(2,3-dihydrothieno-[3,4-b][1,4]dioxin-2-ylmethoxy)-I-propanesulphonic acid, salt).

Regardless of the particular nature of the polymer, the resulting conductive polymer particles typically have an average size (e.g., diameter) of from about 1 to about 80 nanometers, in some embodiments from about 2 to about 70 nanometers, and in some embodiments, from about 3 to about 60 nanometers. The diameter of the particles may be determined using known techniques, such as by ultracentrifuge, laser diffraction, etc. The shape of the particles may likewise vary. In one particular embodiment, for instance, the particles are spherical in shape. However, it should be understood that other shapes are also contemplated by the present invention, such as plates, rods, discs, bars, tubes, irregular shapes, etc.

Although not necessarily required, the conductive polymer particles may be applied in the form of a dispersion. The concentration of the conductive polymer in the dispersion may vary depending on the desired viscosity of the dispersion and the particular manner in which the dispersion is to be applied to the capacitor element. Typically, however, the polymer constitutes from about 0.1 to about 10 wt. %, in some embodiments from about 0.4 to about 5 wt. %, and in some embodiments, from about 0.5 to about 4 wt. % of the dispersion. The dispersion may also contain one or more components to enhance the overall properties of the resulting solid electrolyte. For example, the dispersion may contain a binder to further enhance the adhesive nature of the polymeric layer and also increase the stability of the particles within the dispersion. The binder may be organic in nature, such as polyvinyl alcohols, polyvinyl pyrrolidones, polyvinyl chlorides, polyvinyl acetates, polyvinyl butyrates, polyacrylic acid esters, polyacrylic acid amides, polymethacrylic acid esters, polymethacrylic acid amides, polyacrylonitriles, styrene/acrylic acid ester, vinyl acetate/acrylic acid ester and ethylene/vinyl acetate copolymers, polybutadienes, polyisoprenes, polystyrenes, polyethers, polyesters, polycarbonates, polyurethanes, polyamides, polyimides, polysulfones, melamine formaldehyde resins, epoxide resins, silicone resins or celluloses. Crosslinking agents may also be employed to enhance the adhesion capacity of the binders. Such crosslinking agents may include, for instance, melamine compounds, masked isocyanates or crosslinkable polymers, such as polyurethanes, polyacrylates or polyolefins, and subsequent crosslinking. Dispersion agents may also be employed to facilitate the ability to apply the layer to the anode. Suitable dispersion agents include solvents, such as aliphatic alcohols (e.g., methanol, ethanol, i-propanol and butanol), aliphatic ketones (e.g., acetone and methyl ethyl ketones), aliphatic carboxylic acid esters (e.g., ethyl acetate and butyl acetate), aromatic hydrocarbons (e.g., toluene and xylene), aliphatic hydrocarbons (e.g., hexane, heptane and cyclohexane), chlorinated hydrocarbons (e.g., dichloromethane and dichloroethane), aliphatic nitriles (e.g., acetonitrile), aliphatic sulfoxides and sulfones (e.g., dimethyl sulfoxide and sulfolane), aliphatic carboxylic acid amides (e.g., methylacetamide, dimethylacetamide and dimethylformamide), aliphatic and araliphatic ethers (e.g., diethylether and anisole), water, and mixtures of any of the foregoing solvents. A particularly suitable dispersion agent is water.

In addition to those mentioned above, still other ingredients may also be used in the dispersion. For example, conventional fillers may be used that have a size of from about 10 nanometers to about 100 micrometers, in some embodiments from about 50 nanometers to about 50 micrometers, and in some embodiments, from about 100 nanometers to about 30 micrometers. Examples of such fillers include calcium carbonate, silicates, silica, calcium or barium sulfate, aluminum hydroxide, glass fibers or bulbs, wood flour, cellulose powder carbon black, electrically conductive polymers, etc. The fillers may be introduced into the dispersion in powder form, but may also be present in another form, such as fibers.

Surface-active substances may also be employed in the dispersion, such as ionic or non-ionic surfactants. Furthermore, adhesives may be employed, such as organofunctional silanes or their hydrolysates, for example 3-glycidoxypropyltrialkoxysilane, 3-aminopropyl-triethoxysilane, 3-mercaptopropyl-trimethoxysilane, 3-metacryloxypropyltrimethoxysilane, vinyltrimethoxysilane or octyltriethoxysilane. The dispersion may also contain additives that increase conductivity, such as ether group-containing compounds (e.g., tetrahydrofuran), lactone group-containing compounds (e.g., γ-butyrolactone or γ-valerolactone), amide or lactam group-containing compounds (e.g., caprolactam, N-methylcaprolactam, N,N-dimethylacetamide, N-methylacetamide, N,N-dimethylformamide (DMF), N-methylformamide, N-methylformanilide, N-methylpyrrolidone (NMP), N-octylpyrrolidone, or pyrrolidone), sulfones and sulfoxides (e.g., sulfolane (tetramethylenesulfone) or dimethylsulfoxide (DMSO)), sugar or sugar derivatives (e.g., saccharose, glucose, fructose, or lactose), sugar alcohols (e.g., sorbitol or mannitol), furan derivatives (e.g., 2-furancarboxylic acid or 3-furancarboxylic acid), an alcohols (e.g., ethylene glycol, glycerol, di- or triethylene glycol).

The dispersion may be applied using a variety of known techniques, such as by spin coating, impregnation, pouring, dropwise application, injection, spraying, doctor blading, brushing, printing (e.g., ink-jet, screen, or pad printing), or dipping. The viscosity of the dispersion is typically from about 0.1 to about 100,000 mPas (measured at a shear rate of 100 $s^{-1}$), in some embodiments from about 1 to about 10,000 mPas, in some embodiments from about 10 to about 1,500 mPas, and in some embodiments, from about 100 to about 1000 mPas.

i. Inner Layers

The solid electrolyte is generally formed from one or more "inner" conductive polymer layers. The term "inner" in this context refers to one or more layers that overly the dielectric, whether directly or via another layer (e.g., precoat layer). One or multiple inner layers may be employed. For example, the solid electrolyte typically contains from 2 to 30, in some embodiments from 4 to 20, and in some embodiments, from about 5 to 15 inner layers (e.g., 10 layers). The inner layer(s) may, for example, contain intrinsically and/or extrinsically conductive polymer particles such as described above. For instance, such particles may constitute about 50 wt. % or more, in some embodiments about 70 wt. % or more, and in some embodiments, about 90 wt. % or more (e.g., 100 wt. %) of the inner layer(s). In alternative embodiments, the inner layer(s) may contain an in-situ polymerized conductive polymer. In such embodiments, the in-situ polymerized polymers may constitute about 50 wt. % or more, in some embodiments about 70 wt. % or more, and in some embodiments, about 90 wt. % or more (e.g., 100 wt. %) of the inner layer(s).

ii. Outer Layers

The solid electrolyte may also contain one or more optional "outer" conductive polymer layers that overly the inner layer(s) and are formed from a different material. For example, the outer layer(s) may contain extrinsically conductive polymer particles. In one particular embodiment, the outer layer(s) are formed primarily from such extrinsically conductive polymer particles in that they constitute about 50 wt. % or more, in some embodiments about 70 wt. % or more, and in some embodiments, about 90 wt. % or more (e.g., 100 wt. %) of a respective outer layer. One or multiple outer layers may be employed. For example, the solid electrolyte may contain from 2 to 30, in some embodiments from 4 to 20, and in some embodiments, from about 5 to 15 outer layers, each of which may optionally be formed from a dispersion of the extrinsically conductive polymer particles.

D. External Polymer Coating

An external polymer coating may also overly the solid electrolyte. The external polymer coating generally contains one or more layers formed from pre-polymerized conductive polymer particles such as described above (e.g., dispersion of extrinsically conductive polymer particles). The external coating may be able to further penetrate into the edge region of the capacitor body to increase the adhesion to the dielectric and result in a more mechanically robust part, which may reduce equivalent series resistance and leakage current. Because it is generally intended to improve the degree of edge coverage rather to impregnate the interior of the anode body, the particles used in the external coating typically have a larger size than those employed in the solid electrolyte. For example, the ratio of the average size of the particles employed in the external polymer coating to the average size of the particles employed in any dispersion of the solid electrolyte is typically from about 1.5 to about 30, in some embodiments from about 2 to about 20, and in some embodiments, from about 5 to about 15. For example, the particles employed in the dispersion of the external coating may have an average size of from about 80 to about 500 nanometers, in some embodiments from about 90 to about 250 nanometers, and in some embodiments, from about 100 to about 200 nanometers.

If desired, a crosslinking agent may also be employed in the external polymer coating to enhance the degree of adhesion to the solid electrolyte. Typically, the crosslinking agent is applied prior to application of the dispersion used in the external coating. Suitable crosslinking agents are described, for instance, in U.S. Patent Publication No. 2007/0064376 to Merker, et al. and include, for instance, amines (e.g., diamines, triamines, oligomer amines, polyamines, etc.); polyvalent metal cations, such as salts or compounds of Mg, Al, Ca, Fe, Cr, Mn, Ba, Ti, Co, Ni, Cu, Ru, Ce or Zn, phosphonium compounds, sulfonium compounds, etc. Particularly suitable examples include, for instance, 1,4-diaminocyclohexane, 1,4-bis(amino-methyl) cyclohexane, ethylenediamine, 1,6-hexanediamine, 1,7-heptanediamine, 1,8-octanediamine, 1,9-nonanediamine, 1,10-decanediamine, 1,12-dodecanediamine, N,N-dimethylethylenediamine, N,N,N',N'-tetramethylethylenediamine, N,N,N',N'-tetramethyl-1,4-butanediamine, etc., as well as mixtures thereof.

The crosslinking agent is typically applied from a solution or dispersion whose pH is from 1 to 10, in some embodiments from 2 to 7, in some embodiments, from 3 to 6, as determined at 25° C. Acidic compounds may be employed to help achieve the desired pH level. Examples of solvents or dispersants for the crosslinking agent include water or organic solvents, such as alcohols, ketones, carboxylic esters, etc. The crosslinking agent may be applied to the capacitor body by any known process, such as spin-coating, impregnation, casting, dropwise application, spray application, vapor deposition, sputtering, sublimation, knife-coating, painting or printing, for example inkjet, screen or pad printing. Once applied, the crosslinking agent may be dried prior to application of the polymer dispersion. This process may then be repeated until the desired thickness is achieved. For example, the total thickness of the entire external polymer coating, including the crosslinking agent and dispersion layers, may range from about 1 to about 50 μm, in some embodiments from about 2 to about 40 μm, and in some embodiments, from about 5 to about 20 μm.

E. Cathode Coating

The cathode coating also contains a metal particle layer that overlies the solid electrolyte and other optional layers (e.g., external polymer coating). The metal particle layer includes a plurality of conductive metal particles are dispersed within a resinous polymer matrix. The particles typically constitute from about 50 wt. % to about 99 wt. %, in some embodiments from about 60 wt. % to about 98 wt. %, and in some embodiments, from about 70 wt. % to about 95 wt. % of the layer, while the resinous polymer matrix typically constitutes from about 1 wt. % to about 50 wt. %, in some embodiments from about 2 wt. % to about 40 wt. %, and in some embodiments, from about 5 wt. % to about 30 wt. % of the layer.

The conductive metal particles may be formed from a variety of different metals, such as copper, nickel, silver, nickel, zinc, tin, lead, copper, aluminum, molybdenum, titanium, iron, zirconium, magnesium, etc., as well as alloys thereof. Silver is a particularly suitable conductive metal for use in the layer. The metal particles often have a relatively small size, such as an average size of from about 0.01 to about 50 micrometers, in some embodiments from about 0.1 to about 40 micrometers, and in some embodiments, from about 1 to about 30 micrometers. Typically, only one metal particle layer is employed, although it should be understood that multiple layers may be employed if so desired. The total thickness of such layer(s) is typically within the range of from about 1 μm to about 500 μm, in some embodiments from about 5 μm to about 200 μm, and in some embodiments, from about 10 μm to about 100 μm.

The resinous polymer matrix typically includes a polymer, which may be thermoplastic or thermosetting in nature. Notably, however, the polymer is selected so that it can act as a barrier to electromigration of silver ions, and also so that it contains a relatively small amount of polar groups to minimize the degree of water adsorption in the cathode coating. In this regard, the present inventors have found that vinyl acetal polymers are particularly suitable for this purpose, such as polyvinyl butyral, polyvinyl formal, etc. Polyvinyl butyral, for instance, may be formed by reacting polyvinyl alcohol with an aldehyde (e.g., butyraldehyde). Because this reaction is not typically complete, polyvinyl butyral will generally have a residual hydroxyl content. By minimizing this content, however, the polymer can possess a lesser degree of strong polar groups, which would otherwise result in a high degree of moisture adsorption and result in silver ion migration. For instance, the residual hydroxyl content in polyvinyl acetal may be about 35 mol. % or less, in some embodiments about 30 mol. % or less, and in some embodiments, from about 10 mol. % to about 25 mol. %. One commercially available example of such a polymer is available from Sekisui Chemical Co., Ltd. under the designation "BH-S" (polyvinyl butyral).

To form the cathode coating, a conductive paste is typically applied to the capacitor that overlies the solid electrolyte. One or more organic solvents are generally employed in the paste. A variety of different organic solvents may generally be employed, such as glycols (e.g., propylene glycol, butylene glycol, triethylene glycol, hexylene glycol, polyethylene glycols, ethoxydiglycol, and dipropyleneglycol); glycol ethers (e.g., methyl glycol ether, ethyl glycol ether, and isopropyl glycol ether); ethers (e.g., diethyl ether and tetrahydrofuran); alcohols (e.g., benzyl alcohol, methanol, ethanol, n-propanol, iso-propanol, and butanol); triglycerides; ketones (e.g., acetone, methyl ethyl ketone, and methyl isobutyl ketone); esters (e.g., ethyl acetate, butyl acetate, diethylene glycol ether acetate, and methoxypropyl acetate); amides (e.g., dimethylformamide, dimethylacetamide, dimethylcaprylic/capric fatty acid amide and N-alkylpyrrolidones); nitriles (e.g., acetonitrile, propionitrile, butyronitrile and benzonitrile); sulfoxides or sulfones (e.g., dimethyl sulfoxide (DMSO) and sulfolane); etc., as well as mixtures thereof. The organic solvent(s) typically constitute from about 10 wt. % to about 70 wt. %, in some embodiments from about 20 wt. % to about 65 wt. %, and in some embodiments, from about 30 wt. % to about 60 wt. %. of the paste. Typically, the metal particles constitute from about 10 wt. % to about 60 wt. %, in some embodiments from about 20 wt. % to about 45 wt. %, and in some embodiments, from about 25 wt. % to about 40 wt. % of the paste, and the resinous polymer matrix constitutes from about 0.1 wt. % to about 20 wt. %, in some embodiments from about 0.2 wt. % to about 10 wt. %, and in some embodiments, from about 0.5 wt. % to about 8 wt. % of the paste.

The paste may have a relatively low viscosity, allowing it to be readily handled and applied to a capacitor element. The viscosity may, for instance, range from about 50 to about 3,000 centipoise, in some embodiments from about 100 to about 2,000 centipoise, and in some embodiments, from about 200 to about 1,000 centipoise, such as measured with a Brookfield DV-1 viscometer (cone and plate) operating at a speed of 10 rpm and a temperature of 25° C. If desired, thickeners or other viscosity modifiers may be employed in the paste to increase or decrease viscosity. Further, the thickness of the applied paste may also be relatively thin and still achieve the desired properties. For example, the thickness of the paste may be from about 0.01 to about 50 micrometers, in some embodiments from about 0.5 to about 30 micrometers, and in some embodiments, from about 1 to about 25 micrometers. Once applied, the metal paste may be optionally dried to remove certain components, such as the organic solvents. For instance, drying may occur at a temperature of from about 20° C. to about 150° C., in some embodiments from about 50° C. to about 140° C., and in some embodiments, from about 80° C. to about 130° C.

F. Other Components

If desired, the capacitor may also contain other layers as is known in the art. In certain embodiments, for instance, a carbon layer (e.g., graphite) may be positioned between the solid electrolyte and the silver layer that can help further limit contact of the silver layer with the solid electrolyte.

In addition, a pre-coat layer may be employed in certain embodiments that overlies the dielectric and includes an organometallic compound. The organometallic compound may have the following general formula:

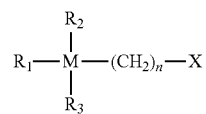

wherein,

M is an organometallic atom, such as silicon, titanium, and so forth;

$R_1$, $R_2$, and $R_3$ are independently an alkyl (e.g., methyl, ethyl, propyl, etc.) or a hydroxyalkyl (e.g., hydroxymethyl, hydroxyethyl, hydroxypropyl, etc.), wherein at least one of $R_1$, $R_2$, and $R_3$ is a hydroxyalkyl;

n is an integer from 0 to 8, in some embodiments from 1 to 6, and in some embodiments, from 2 to 4 (e.g., 3); and X is an organic or inorganic functional group, such as glycidyl, glycidyloxy, mercapto, amino, vinyl, etc.

In certain embodiments, $R_1$, $R_2$, and $R_3$ may a hydroxyalkyl (e.g., $OCH_3$). In other embodiments, however, $R_1$ may be an alkyl (e.g., $CH_3$) and $R_2$ and $R_3$ may a hydroxyalkyl (e.g., $OCH_3$).

Further, in certain embodiments, M may be silicon so that the organometallic compound is an organosilane compound, such as an alkoxysilane. Suitable alkoxysilanes may include, for instance, 3-aminopropyltrimethoxysilane, 3-aminopropyltriethoxysilane, 3-aminopropylmethyldimethoxysilane, 3-aminopropylmethyldiethoxysilane, 3-(2-aminoethyl)aminopropyltrimethoxysilane, 3-mercaptopropyltrimethoxysilane, 3-mercaptopropyltriethoxysilane, 3-mercaptopropylmethyldimethoxysilane, 3-mercaptopropylmethyldiethoxysilane, glycidoxymethyltrimethoxysilane, glycidoxymethyltriethoxysilane, glycidoxymethyltripropoxysilane, glycidoxymethyltributoxysilane, β-glycidoxyethyltrimethoxysilane, β-glycidoxyethyltriethoxysilane, β-glycidoxyethyltripropoxysilane, β-glycidoxyethyltributoxysilane, β-glycidoxyethyltrimethoxysilane, α-glycidoxyethyltriethoxysilane, α-glycidoxyethyltripropoxysilane, α-glycidoxyethyltributoxysilane, γ-glycidoxypropyltrimethoxysilane, γ-glycidoxypropyltriethoxysilane, γ-glycidoxypropyl-tripropoxysilane, γ-glycidoxypropyltributoxysilane, β-glycidoxypropyltrimethoxysilane, β-glycidoxypropyltriethoxysilane, β-glycidoxypropyltripropoxysilane, α-glycidoxypropyltributoxysilane, α-glycidoxypropyltrimethoxysilane, α-glycidoxypropyltriethoxysilane, α-glycidoxypropyl-tripropoxysilane, α-glycidoxypropyltributoxysilane, γ-glycidoxybutyltrimethoxysilane, δ-glycidoxybutyltriethoxysilane, δ-glycidoxybutyltripropoxysilane, δ-glycidoxybutyltributoxysilane, δ-glycidoxybutyltrimethoxysilane, γ-glycidoxybutyltriethoxysilane, γ-glycidoxybutyltripropoxysilane, γ-propoxybutyltributoxysilane, δ-glycidoxybutyltrimethoxysilane, δ-glycidoxybutyltriethoxysilane, δ-glycidoxybutyltripropoxysilane, α-glycidoxybutyltrimethoxysilane, α-glycidoxybutyltriethoxysilane, α-glycidoxybutyltripropoxysilane, α-glycidoxybutyltributoxysilane, (3,4-epoxycyclohexyl)-methyltrimethoxysilane, (3,4-epoxycyclohexyl)methyltriethoxysilane, (3,4-epoxycyclohexyl)methyltripropoxysilane, (3,4-epoxycyclohexyl)-methyltributoxysilane, (3,4-epoxycyclohexyl)ethyltrimethoxysilane, (3,4-epoxycyclohexyl)ethyltriethoxysilane, (3,4-epoxycyclohexyl)ethyltripropoxysilane, (3,4-epoxycyclohexyl)ethyltributoxysilane, (3,4-epoxycyclohexyl)propyltrimethoxysilane, (3,4-epoxycyclohexyl)propyltriethoxysilane, (3,4-epoxycyclohexyl)propyltripropoxysilane, (3,4-epoxycyclohexyl)propyltributoxysilane, (3,4-epoxycyclohexyl)butyltrimethoxysilane, (3,4-epoxycyclohexy)butyltriethoxysilane, (3,4-epoxycyclohexyl)butyltripropoxysilane, (3,4-epoxycyclohexyl)butyltributoxysilane, and so forth.

The particular manner in which the pre-coat layer is applied to the capacitor body may vary as desired. In one particular embodiment, the compound is dissolved in an organic solvent and applied to the part as a solution, such as by screen-printing, dipping, electrophoretic coating, spraying, etc. The organic solvent may vary, but is typically an alcohol, such as methanol, ethanol, etc. Organometallic compounds may constitute from about 0.1 wt. % to about 10 wt. %, in some embodiments from about 0.2 wt. % to about 8 wt. %, and in some embodiments, from about 0.5 wt. % to about 5 wt. % of the solution. Solvents may likewise constitute from about 90 wt. % to about 99.9 wt. %, in some embodiments from about 92 wt. % to about 99.8 wt. %, and in some embodiments, from about 95 wt. % to about 99.5 wt. % of the solution. Once applied, the part may then be dried to remove the solvent therefrom and form a pre-coat layer containing the organometallic compound.

II. Terminations

Once the desired layers are formed, the capacitor may be provided with terminations. For example, the capacitor may contain an anode termination to which an anode lead of the capacitor is electrically connected and a cathode termination to which the cathode of the capacitor is electrically connected. Any conductive material may be employed to form the terminations, such as a conductive metal (e.g., copper, nickel, silver, nickel, zinc, tin, palladium, lead, copper, aluminum, molybdenum, titanium, iron, zirconium, magnesium, and alloys thereof). Particularly suitable conductive metals include, for instance, copper, copper alloys (e.g., copper-zirconium, copper-magnesium, copper-zinc, or copper-iron), nickel, and nickel alloys (e.g., nickel-iron). The thickness of the terminations is generally selected to minimize the thickness of the capacitor. For instance, the thickness of the terminations may range from about 0.05 to about 1 millimeter, in some embodiments from about 0.05 to about 0.5 millimeters, and from about 0.07 to about 0.2 millimeters. One exemplary conductive material is a copper-iron alloy metal plate available from Wieland (Germany). If desired, the surface of the terminations may be electroplated with nickel, silver, gold, tin, etc. as is known in the art to ensure that the final part is mountable to the circuit board. In one particular embodiment, both surfaces of the terminations are plated with nickel and silver flashes, respectively, while the mounting surface is also plated with a tin solder layer.

The terminations may be connected to the capacitor using any technique known in the art. In one embodiment, for example, a lead frame may be provided that defines the cathode termination and anode termination. To attach the electrolytic capacitor to the lead frame, a conductive adhesive may initially be applied to a surface of the cathode termination. The conductive adhesive may include, for instance, conductive metal particles contained with a resin composition. The metal particles may be silver, copper, gold, platinum, nickel, zinc, bismuth, etc. The resin composition may include a thermoset resin (e.g., epoxy resin), curing agent (e.g., acid anhydride), and coupling agent (e.g., silane coupling agents). Suitable conductive adhesives may be described in U.S. Patent Application Publication No. 2006/0038304 to Osako, et al. Any of a variety of techniques may be used to apply the conductive adhesive to the cathode termination. Printing techniques, for instance, may be employed due to their practical and cost-saving benefits. The anode lead may also be electrically connected to the anode termination using any technique known in the art, such as mechanical welding, laser welding, conductive adhesives, etc. Upon electrically connecting the anode lead to the anode termination, the conductive adhesive may then be cured to ensure that the electrolytic capacitor is adequately adhered to the cathode termination.

Referring to FIG. 1, for example, the electrolytic capacitor 30 is shown as including an anode termination 62 and a cathode termination 72 in electrical connection with the capacitor element 33. Although it may be in electrical contact with any of the surfaces of the capacitor element 33, the cathode termination 72 in the illustrated embodiment is in electrical contact with the lower surface 39 via a conductive adhesive. More specifically, the cathode termination 72 contains a first component 73 that is in electrical contact and generally parallel with the lower surface 39 of the capacitor element 33. The cathode termination 72 may also contain a second component 74 that is substantially perpendicular to the first component 73 and in electrical contract with a rear surface 38 of the capacitor element 33. The anode termination 62 likewise contains a first component 63 positioned substantially perpendicular to a second component 64. The first component 63 is in electrical contact and generally parallel with the lower surface 39 of the capacitor element 33. The second component 64 contains a region 51 that carries an anode lead 16. Although not depicted in FIG. 1, the region 51 may possess a "U-shape" to further enhance surface contact and mechanical stability of the lead 16.

The terminations may be connected to the capacitor element using any technique known in the art. In one embodiment, for example, a lead frame may be provided that defines the cathode termination 72 and anode termination 62. To attach the electrolytic capacitor element 33 to the lead frame, the conductive adhesive may initially be applied to a surface of the cathode termination 72. The conductive adhesive may include, for instance, conductive metal particles contained with a resin composition. The metal particles may be silver, copper, gold, platinum, nickel, zinc, bismuth, etc. The resin composition may include a thermoset resin (e.g., epoxy resin), curing agent (e.g., acid anhydride), and coupling agent (e.g., silane coupling agents). Suitable conductive adhesives may be described in U.S. Patent Publication No. 2006/0038304 to Osako, et al. Any of a variety of techniques may be used to apply the conductive adhesive to the cathode termination 72. Printing techniques, for instance, may be employed due to their practical and cost-saving benefits.

A variety of methods may generally be employed to attach the terminations to the capacitor. In one embodiment, for example, the second component 64 of the anode termination 62 is initially bent upward to the position shown in FIG. 1. Thereafter, the capacitor element 33 is positioned on the cathode termination 72 so that its lower surface 39 contacts the adhesive and the anode lead 16 is received by the region 51. If desired, an insulating material (not shown), such as a plastic pad or tape, may be positioned between the lower surface 39 of the capacitor element 33 and the first component 63 of the anode termination 62 to electrically isolate the anode and cathode terminations.

The anode lead 16 is then electrically connected to the region 51 using any technique known in the art, such as mechanical welding, laser welding, conductive adhesives, etc. For example, the anode lead 16 may be welded to the anode termination 62 using a laser. Lasers generally contain resonators that include a laser medium capable of releasing photons by stimulated emission and an energy source that excites the elements of the laser medium. One type of suitable laser is one in which the laser medium consist of an aluminum and yttrium garnet (YAG), doped with neodymium (Nd). The excited particles are neodymium ions $Nd^{3+}$. The energy source may provide continuous energy to the laser medium to emit a continuous laser beam or energy discharges to emit a pulsed laser beam. Upon electrically connecting the anode lead 16 to the anode termination 62, the conductive adhesive may then be cured. For example, a heat press may be used to apply heat and pressure to ensure that the electrolytic capacitor element 33 is adequately adhered to the cathode termination 72 by the adhesive.

III. Casing

The capacitor element is generally encapsulated within a casing so that at least a portion of the anode and cathode terminations are exposed for mounting onto a circuit board. As shown in FIG. 1, for instance, the capacitor element 33 is encapsulated within a casing 28 so that a portion of the anode termination 62 and a portion of the cathode termination 72 are exposed. The casing is typically formed from a thermoset resin. Examples of such resins include, for instance, epoxy resins, polyimide resins, melamine resins, urea-formaldehyde resins, polyurethane resins, phenolic resins, polyester resins, etc. Epoxy resins are also particularly suitable. Still other additives may also be employed, such as photoinitiators, viscosity modifiers, suspension aiding agents, pigments, stress reducing agents, non-conductive fillers, stabilizers, etc. For example, the non-conductive fillers may include inorganic oxide particles, such as silica, alumina, zirconia, magnesium oxide, iron oxide, copper oxide, zeolites, silicates, clays (e.g., smectite clay), etc., as well as composites (e.g., alumina-coated silica particles) and mixtures thereof.

Regardless of its particular construction, the resulting capacitor assembly can exhibit a variety of beneficial properties. For example, the dissipation factor of the capacitor assembly may be maintained at relatively low levels. The dissipation factor generally refers to losses that occur in the capacitor and is usually expressed as a percentage of the ideal capacitor performance. For example, the dissipation factor of the capacitor of the present invention is typically from about 1% to about 25%, in some embodiments from about 3% to about 10%, and in some embodiments, from about 5% to about 15%, as determined at a frequency of 120 Hz. The capacitor assembly may also be able to be employed in high voltage applications, such as at rated voltages of about 35 volts or more, in some embodiments about 50 volts or more, and in some embodiments, from about 60 volts to about 200 volts. The capacitor assembly may, for example, exhibit a relatively high "breakdown voltage" (voltage at which the capacitor fails), such as about 2 volts or more, in some embodiments about 5 volts or more, in some embodiments about 10 volts or more, and in some embodiments, from about 10 to about 100 volts. Likewise, the capacitor assembly may also be able to withstand relatively high surge currents, which is also common in high voltage applications. The peak surge current may be, for example, about 100 Amps or more, in some embodiments about 200 Amps or more, and in some embodiments, and in some embodiments, from about 300 Amps to about 800 Amps.

The present invention may be better understood by reference to the following examples.

Test Procedures

Capacitance

The capacitance may be measured using a Keithley 3330 Precision LCZ meter with Kelvin Leads with 2.2 volt DC bias and a 0.5 volt peak to peak sinusoidal signal. The operating frequency may be 120 Hz and the temperature may be 23° C.±2° C. In some cases, the "wet-to-dry" capacitance can be determined. The "dry capacitance" refers to the capacitance of the part before application of the solid electrolyte, graphite, and silver layers, while the "wet capacitance" refers to the capacitance of the part after formation of the dielectric, measured in 14% nitric acid in reference to 1 mF tantalum cathode with 10 volt DC bias and a 0.5 volt peak to peak sinusoidal signal after 30 seconds of electrolyte soaking.

Equivalent Series Resistance (ESR)

Equivalence series resistance may be measured using a Keithley 3330 Precision LCZ meter with Kelvin Leads 2.2 volt DC bias and a 0.5 volt peak to peak sinusoidal signal. The operating frequency may 100 kHz and the temperature may be 23° C.±2° C.

Humidity Testing

Humidity testing may be conducted (25 parts) at a temperature of 85° C., 85% relative humidity, and at the rated voltage (e.g., 16 volts). Capacitance and ESR can be recorded after 120, 500, and 1,000 hours at recovered samples and then compared to the initial measurement at 0 hours. The recovery time after the test conditions may be from 6 to 24 hours.

EXAMPLE 1

70,000 μFV/g tantalum powder was used to form anode samples. Each anode sample was embedded with a tantalum wire, sintered at 1300° C., and pressed to a density of 6.8 g/cm3. The resulting pellets had a size of 1.80×2.40×1.20 mm. The pellets were anodized to 14.4 volts in water/phosphoric acid electrolyte with a conductivity of 8.6 mS at a temperature of 85° C. to form the dielectric layer. The pellets were anodized again to 70 volts in a water/boric acid/disodium tetraborate with a conductivity of 2.0 mS at a temperature of 30° C. for 25 seconds to form a thicker oxide layer built up on the outside.

A conductive polymer coating was then formed by dipping the anode into a butanol solution of iron (III) toluenesulfonate (Clevios™ C, H.C. Starck) for 5 minutes and consequently into 3,4-ethylenedioxythiophene (Clevios™ M, H.C. Starck) for 1 minute. After 45 minutes of polymerization, a thin layer of poly(3,4-ethylenedioxythiophene) was formed on the surface of the dielectric. The anode was washed in methanol to remove reaction by-products, anodized in a liquid electrolyte, and washed again in methanol. This process was repeated 12 times.

The parts were then dipped into a graphite dispersion and dried. Finally, the parts were dipped into a silver dispersion and dried. Multiple parts (10000) of 100 μF/6.3V capacitors were made in this manner and encapsulated in a silica resin.

EXAMPLE 2

Capacitors were formed in the manner described in Example 1, except that a silver dispersion is employed in the cathode coating as described herein. Multiple parts (10000) of 100 μF/6.3V capacitors were formed and encapsulated in a silica resin.

25 parts of finished capacitors of Examples 1-2 were then tested for electrical performance. The median results (first quartile ("Q1"), median and third quartile ("Q3") of capacitance (CAP) and ESR within 85° humidity testing at rated voltage are set forth below in Table 1 and Table 2.

TABLE 1

| Humidity Testing Results (CAP) | | | | |
|---|---|---|---|---|
| | Time · [h] | Q1 - CAP [μF] | median - CAP [μF] | Q3 - CAP [μF] |
| Example 1 | 0 | 86.94 | 88.50 | 90.19 |
| | 500 | 11.25 | 100.09 | 101.09 |
| | 1000 | 1.20 | 27.06 | 98.54 |

TABLE 1-continued

| Humidity Testing Results (CAP) | | | | |
|---|---|---|---|---|
| | Time · [h] | Q1 - CAP [μF] | median - CAP [μF] | Q3 - CAP [μF] |
| Example 2 | 0 | 88.33 | 90.78 | 92.89 |
| | 500 | 96.91 | 100.19 | 101.44 |
| | 1000 | 86.79 | 96.19 | 98.90 |

TABLE 2

| Humidity Testing Results (ESR) | | | | |
|---|---|---|---|---|
| | Time · [h] | Q1 - ESR [Ohms] | median - ESR [Ohms] | Q3 - ESR [Ohms] |
| Example 1 | 0 | 0.1597 | 0.1896 | 0.2378 |
| | 500 | 0.2948 | 0.7439 | 176.5 |
| | 1000 | 0.3567 | 242.7 | 390.6 |
| Example 2 | 0 | 0.0933 | 0.0922 | 0.1149 |
| | 500 | 0.2157 | 0.2471 | 0.5101 |
| | 1000 | 0.2549 | 0.3069 | 1.2319 |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A solid electrolytic capacitor comprising:

a sintered porous anode body;

a dielectric that overlies the anode body;

a solid electrolyte that overlies the dielectric, wherein the solid electrolyte includes a plurality of conductive polymer particles; and a cathode coating that contains a metal particle layer that overlies the solid electrolyte, wherein the metal particle layer includes a plurality of conductive metal particles dispersed within a resinous polymer matrix, where the particles constitute from about 50 wt. % to about 99 wt. % of the layer and the resinous polymer matrix constitutes from about 1 wt. % to about 50 wt. % of the layer, wherein the resinous polymer matrix includes a vinyl acetal polymer.

2. The solid electrolytic capacitor of claim 1, wherein the metal particles include silver.

3. The solid electrolytic capacitor of claim 1, wherein the vinyl acetal polymer is polyvinyl butyral.

4. The solid electrolytic capacitor of claim 1, wherein the vinyl acetal polymer has a residual hydroxyl content of about 35 mol. % or less.

5. The solid electrolytic capacitor of claim 1, wherein the anode body includes tantalum.

6. The solid electrolytic capacitor of claim 1, wherein the conductive polymer particles contain an extrinsically conductive polymer having repeating units of the following formula (III):

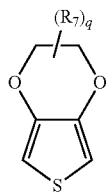

wherein,
R₇ is a linear or branched, $C_1$ to $C_{18}$ alkyl radical, $C_5$ to $C_{12}$ cycloalkyl radical, $C_6$ to $C_{14}$ aryl radical, $C_7$ to $C_{18}$ aralkyl radical, or a combination thereof; and
q is an integer from 0 to 8.

7. The solid electrolytic capacitor of claim 6, wherein the extrinsically conductive polymer is poly(3,4-ethylenedioxythiophene).

8. The solid electrolytic capacitor of claim 6, wherein the particles also contain a polymeric counterion.

9. The solid electrolytic capacitor of claim 1, wherein the conductive polymer particles contain an intrinsically conductive polymer having repeating units of the following formula (IV):

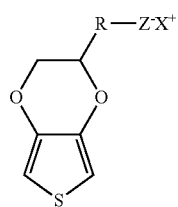

wherein,
R is $(CH_2)_a$—O—$(CH_2)_b$;
a is from 0 to 10;
b is from 1 to 18;
Z is an anion;
X is a cation.

10. The solid electrolytic capacitor of claim 1, further comprising an external polymer coating that overlies the solid electrolyte and contains pre-polymerized conductive polymer particles and a cross-linking agent.

11. The solid electrolytic capacitor of claim 1, further comprising:
an anode termination that is in electrical connection with the anode body;
a cathode termination that is in electrical connection with the solid electrolyte; and
a casing that encloses the anode, dielectric, solid electrolyte, and silver layer and leaves exposed at least a portion of the anode termination and the cathode termination.

12. The solid electrolytic capacitor of claim 1, wherein the capacitor is in contact with an atmosphere having a relative humidity of about 40% or more.

13. The solid electrolytic capacitor of claim 1, wherein the cathode coating exhibits a moisture content of about 10 wt. % or less when exposed to an atmosphere having an 85% relative humidity in accordance with ASTM D6869-03 (2011).

14. A solid electrolytic capacitor comprising:
a sintered porous anode body that includes tantalum;
a dielectric that overlies the anode body, wherein the dielectric includes an oxide of tantalum;
a solid electrolyte that overlies the dielectric, wherein the solid electrolyte includes a plurality of conductive polymer particles, wherein the conductive polymer particles include a thiophene polymer; and
a cathode coating that contains a metal particle layer that overlies the solid electrolyte, wherein the metal particle layer includes a plurality of silver particles dispersed within a resinous polymer matrix, where the particles constitute from about 50 wt. % to about 99 wt. % of the layer and the resinous polymer matrix constitutes from about 1 wt. % to about 50 wt. % of the layer, wherein the cathode coating exhibits a moisture content of about 10 wt. % or less when exposed to an atmosphere having an 85% relative humidity in accordance with ASTM D6869-03 (2011).

15. The solid electrolytic capacitor of claim 14, wherein the resinous polymer matrix includes a polyvinyl butyral having a residual hydroxyl content of about 35 mol. % or less.

16. The solid electrolytic capacitor of claim 14, wherein the thiophene polymer is poly(3,4-ethylenedioxythiophene).

17. The solid electrolytic capacitor of claim 14, wherein the particles also contain a polymeric counterion.

18. The solid electrolytic capacitor of claim 14, further comprising an external polymer coating that overlies the solid electrolyte and contains pre-polymerized conductive polymer particles and a cross-linking agent.

19. The solid electrolytic capacitor of claim 14, wherein the capacitor is in contact with an atmosphere having a relative humidity of about 40% or more.

20. A method for forming a capacitor, the method comprising:
anodically oxidizing a sintered porous anode body to form a dielectric that includes an oxide of a valve metal compound;
applying a dispersion that contains conductive polymer particles to form a solid electrolyte layer; and
applying a metal paste over the solid electrolyte layer, wherein the paste contains a plurality of conductive metal particles, a vinyl acetal polymer, and an organic solvent; and
drying the metal paste.

21. The method of claim 20, wherein the metal particles include silver.

22. The method of claim 20, wherein the paste has a viscosity of from about 200 to about 1,000 centipoise at a temperature of 25° C.

23. The method of claim 20, wherein the metal particles constitute from about 25 wt. % to about 40 wt. % of the paste.

* * * * *